Sept. 15, 1959  R. R. WITHERELL  2,904,055
HYDRAULIC AMPLIFIER VALVE WITH FEEDBACK
Filed Feb. 13, 1957  2 Sheets-Sheet 1

INVENTOR
ROBERT R. WITHERELL
BY John F. Lawler
ATTORNEY

Sept. 15, 1959    R. R. WITHERELL    2,904,055
HYDRAULIC AMPLIFIER VALVE WITH FEEDBACK
Filed Feb. 13, 1957    2 Sheets-Sheet 2

INVENTOR
ROBERT R. WITHERELL
BY John F. Lawler
ATTORNEY

United States Patent Office 2,904,055
Patented Sept. 15, 1959

2,904,055
HYDRAULIC AMPLIFIER VALVE WITH FEEDBACK

Robert R. Witherell, Los Altos, Calif., assignor to Textron Inc., Belmont, Calif., a corporation of Rhode Island Application February 13, 1957, Serial No. 639,889

7 Claims. (Cl. 137—623)

This invention relates to servo mechanisms and in particular to an improved construction of an electro-hydraulic servo control valve of the type in which a piston valve is displaced from a neutral position in response to a differential signal pressure for controlling fluid flow to and from an actuator.

In such control valves, the movable element is slidable in a cylinder and comprises a peripherally recessed spool defining axially spaced lands or pistons which overlie corresponding ports in the cylinder and serve to regulate the flow of pressure fluid to and from the actuator. The spool in a neutral position distributes hydraulic fluid at equal pressures from the supply pressure port to control pressure ports which are connected to opposite sides of the actuator which under this condition is stationary. Through application of a differential pressure from a hydraulic preamplifier to opposite ends of the spool, the latter is axially displaced to one side or the other of neutral, causing a differential flow to and desired movement of the actuator. The magnitudes of the differential pressures which move the spool are considerably smaller than the actuator control pressures and accordingly, the valve is a proportional hydraulic amplifier. Many prior valves of this type have employed centering or biasing springs disposed to act on opposite ends of the spool to insure that displacement of the latter is proportional to preamplifier pressures and to return the spool to its neutral position when the differential pressure on its ends is zero. By way of example, such a prior valve construction is shown in Moog, Jr. Patent No. 2,767,689. Biasing springs adversely affect valve operation in several respects: lateral forces, however slight, exerted by the springs on the spool sliding friction between spool and sleeve; valve hysteresis losses are increased; the springs require additional chamber space; and because of the temperature coefficient of the spring material, spring characteristics change with temperature variations of the hydraulic fluid in which the springs are disposed. These factors are important in servo valve designs because of the high degree of hydraulic amplification which is involved, and further, because the present demand is for an increasingly high order of fidelity linearity, sensitivity and speed of response in such control valves.

A principal object of the present invention is the provision of a servo valve in which the above named disadvantages are avoided. Another object is the provision of this type of valve with hydraulic means as distinguished from mechanical springs for centering the valve spool within the cylinder and for balancing actuating pressures applied to the spool so that displacement of the spool is proportional to the difference in such pressures. A more specific object is the provision of a closed loop hydraulic servo valve in which variable orifices or flow edges in the spool are utilized to effect rebalance of the hydraulic bridge. Another object is the provision of an electro-hydraulic servo valve connected in a balanced hydraulic bridge circuit that contains two pairs of variable orifices, one pair being utilized to unbalance the circuit in proportion to an electric signal and the other pair being varied in proportion to valve displacement to rebalance the circuit. Another object is the provision of a four-way servo valve having a movable spool element for controlling fluid flow to and from an actuator, and a pair of variable orifices which are varied in response to spool movement to rebalance the hydraulic spool actuating circuit, the location of said orifices being independent of the location of the flow ports controlled by said spool. A further object is the provision of a hydraulic servo valve in which the spool is so formed that the required change of volume in the spool end chambers per unit of spool displacement is a minimum, thereby increasing the frequency response of the valve. Another object is the provision of an electro-hydraulic servo valve construction in which the rate of motion of the actuator is proportional to the input current to the electrical actuating means. Still another object is the provision of a servo valve having a movable spool element which is displaced solely in response to hydraulic pressure. Still another object is the provision of a servo valve characterized by high power amplification and speed of response and which requires a minimum of adjustment and maintenance even after long periods of operation.

These and other objects of my invention will become apparent and my invention will be better understood from the following description of preferred and modified forms thereof, reference being had to the accompanying drawings in which.

Figure 1:
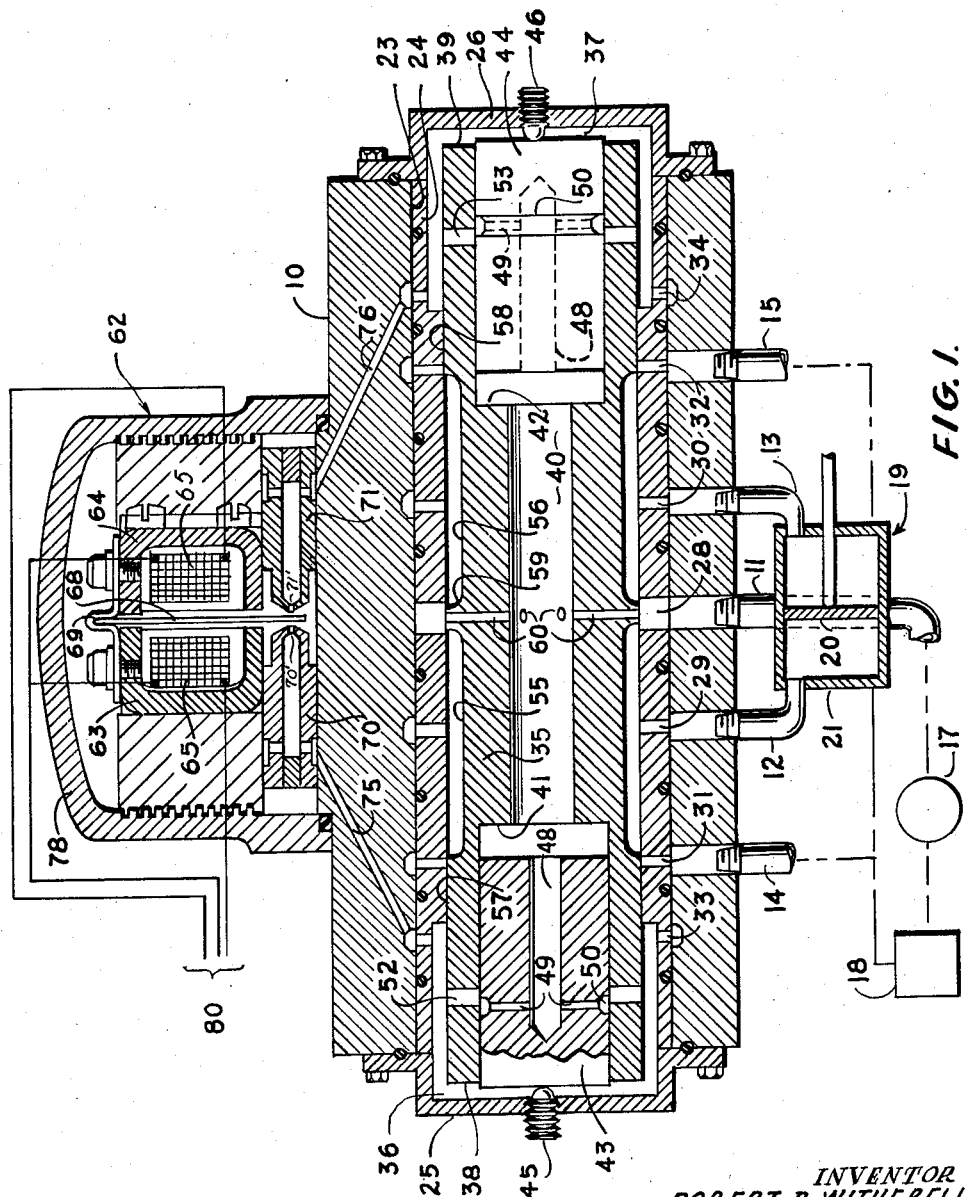
Figure 1 is a central longitudinal section of a preamplifier and a main valve assembly embodying my invention.

Referring to Figure 1, there is shown a valve housing 10 having a fluid pressure supply line 11, a pair of output or control conduits 12 and 13, and two fluid drain conduits 14 and 15. To supply fluid under pressure to supply line 11, a pump, represented schematically at 17 is provided, and the sump or reservoir 18 associated with the pump receives return fluid from common connections to drain conduits 14 and 15. Output conduits 12 and 13 carry fluid at differential pressures for supplying motive fluid to an actuator 19, shown schematically as a piston 20 in a cylinder 21, and for this purpose, the control conduits are connected to the cylinder on opposite sides of the piston.

Valve housing 10 is formed with a longitudinal bore 23 fitted with a stationary cylindrical valve sleeve 24, and having end caps 25 and 26 closing the ends of the bore. The interior of the sleeve communicates with the exterior of valve housing 10 by a series of axially spaced radial ports in the sleeve wall symmetrically arranged about the center of the sleeve, these ports being identified as supply pressure port 28 connected to pressure line 11, control ports 29 and 30 connected to output conduits 12 and 13, respectively, drain ports 31 and 32 communicating with drain lines 14 and 15, respectively, and ports 33 and 34 near opposite ends of the sleeve connected to valve actuating pressure means described below. A spool 35 is disposed to slide within sleeve 24 and constitutes the movable element of the valve which is selectively axially displaced in the sleeve to differentially distribute pressure fluid to outlet conduits 12 and 13. The ends of the spool are spaced from closure caps 25 and 26 and define therewith chambers 36 and 37 in which fluid pressure is differentially varied, and the resultant unbalanced forces acting against spool end surfaces 38 and 39 cause axial displacement of the spool relative to ported sleeve 24.

Spool 35 is tubular in form and has a central bore 40 which steps from a minimum diameter along the central part of the spool to a larger diameter at opposite end portions of the spool thereby defining annular internal shoulders 41 and 42 within the spool. Fitted closely within the enlarged ends of spool bore 40 are cylindrical end plugs 43 and 44, the outer faces of which abut against adjustment screws 45 and 46, respectively, which are threaded through the associated caps. These plugs are constructed identically and each has an axial recess 48 drilled in its inner face, and radial passages 49 terminating in an annular groove 50 in the periphery of the plug. Rebalance ports 52 and 53 in the wall of the spool partially overlie the respective plug grooves 50 and constitute variable orifices through which pressure fluid from the interior of spool 35 communicates with end chambers 36 and 37, respectively, the size of these orifice openings depending upon the axial position of the spool within valve sleeve 24. Pressure fluid in the spool bore, which always exceeds the pressure in end chambers 36 and 37, presses the plugs against screws 45 and 46, and the axial position of each plug is adjusted by the associated screw to obtain equal opening of ports 52 and 53 with the spool in its null position. Consequently, during operation of the valve, the plugs 43 and 44 remain stationary relative to the valve housing, while spool 35 slides axially within sleeve 24.

In order to control distribution of motive fluid to and from actuator 19, spool 35 is externally recessed at 55 and 56 to define end pistons or lands 57 and 58 and a central land 59, which lands engage and slide along the smooth inner surface of sleeve 24. Radial passages 60 in center land 59 connect the inside of the spool with supply pressure port 28 so that fluid at line pressure fills the spool bore and passes through restricted orifices 52 and 53 to end chambers 36 and 37, respectively. The width of center land 59 is smaller than the corresponding dimension of supply pressure port 28 in sleeve 24 so that fluid pressure available to control ports 29 and 30 is equal when the spool is in a neutral position with land 59 centered relative to port 28, as shown in Figure 1. The inner edges of end lands 57 and 58 just cover drain ports 31 and 32, respectively, when the spool is so centered and flow of fluid to or from the actuator is prevented. However, displacement of the spool to one side of neutral, for example, to the right of the position shown in Figure 1, causes an increase in fluid pressure at left control port 29, a decrease in pressure at right port 30, and opening of right drain port 32, so that a differential pressure appears across opposite ends of actuator piston 20 to move it to the right with a velocity proportional to the magnitude of displacement of the spool. It will be noted that plugs 43 and 44 are pressed tightly against adjusting screws 45 and 46, respectively, by the pressure fluid in the spool bore.

Fluid pressure for causing controlled displacement of spool 35 within sleeve 24 is derived from an electrohydraulic preamplifier assembly 62 mounted on valve housing 10 and comprising a pair of permanent magnets, not shown, having laterally spaced pole pieces 63 and 64, respectively, the magnets being arranged so that adjacent pole pieces are of opposite polarity. A coil 65, which is center tapped to provide effectively two coils, is disposed between the pole pieces as shown. A flapper or armature plate 68 made of magnetically permeable material is cantilever supported at its upper end 69 and extends between the pole pieces and through coil 65. Plate 68 has a relatively low spring rate at the pole pieces by reason of its cantilever mounting, and thus is relatively freely movable within the gaps of the pole pieces. The opposite or free end of plate 68 below the pole pieces extends between opposed laterally spaced fixed nozzles 70 and 71 which have restricted discharge openings or orifices 70' and 71', respectively, in the ends thereof adjacent to plate 68. Nozzles 70 and 71 together with plate 68 comprise a pair of variable flow restricting devices which are connected in a balanceable hydraulic circuit having its input connected to the source of supply pressure fluid. Pressure fluid is communicated to the nozzles from the interior of spool and is discharged from the nozzle orifices to drain by a separated passage, not shown. Fluid pressure in the nozzles is transmitted to spool end chambers 36 and 37 by passages 75 and 76 in the valve housing which connect the interiors of the nozzles to ports 33 and 34, respectively, in sleeve 24. The entire preamplifier is enclosed in a casing 78 secured and sealed to the valve housing.

Flapper plate 68 is supported at its upper end in such a manner that with no current supplied to coil 65 through control leads 80, the plate extends midway between the pole pieces and is centered between nozzle orifices 70' and 71'. For this condition, the nozzle orifices are equally restricted and the pressures in the nozzles are equal. Energization of coil 65 with a signal of one sense causes deflection of the plate, for example, toward nozzle 70 and in proportion to the magnitude of the energizing current, thereby increasing restriction of fluid through orifice 70' and decreasing restriction of fluid flowing through orifice 71'. The hitherto equal pressures in the nozzles now become proportionally unbalanced, the higher of the differential pressures being transmitted by passage 75 to chamber 36 and causing displacement of spool 35 to the right, as viewed. Conversely, movement of armature plate 68 to the right, as viewed, of center causes an increase of pressure in chamber 37 and a decrease of pressure in chamber 36, and the spool moves to the left.

In order that displacement of valve spool 35 and ultimately movement of piston 20 of the actuator shall be proportional to the magnitude as well as the sense of coil energizing current, the axial position of plugs 43 and 44 relative to the spool is adjusted by screws 45 and 46, respectively, so that with the spool in its center or neutral position as shown in the drawing, grooves 50 in the plugs overlie equal but less than all of the areas of the respective spool end ports 52 and 53; plug grooves 50 being offset from the ports in a direction toward the respective spool ends. Under this condition, pressure fluid in the bore of the spool passes through the plugs and is restricted equally at ports 52 and 53, and, with armature plate 68 of the preamplifier in the centered position, the pressures of the fluid communicating with chambers 36 and 37 from the nozzles 70 and 71 and from within the spool are equal and opposed, and the spool is stationary in the neutral position. Assume now that a differential pressure is generated in the preamplifier, caused by a signal current of one sense applied to coil 65 of the electromagnetic device which deflects armature plate 68 to the left of center, that is, closer to nozzle 70 and farther from nozzle 71. Pressure proportionally builds up in spool chamber 36 and falls off in chamber 37, creating an unbalance of forces on the ends of the spool and moving the spool to the right as viewed. Such spool movement relative to plugs 43 and 44 further restricts spool port 52 and increases the opening of port 53 until fluid pressure available from the interior of the spool increases the pressure in chamber 37 and decreases pressure in chamber 36 to effect rebalance of the opposing forces on the ends of the spool. When rebalance occurs, the spool stops. The spool remains stationary in its displaced position to the right of neutral and, as described above, distributes motive fluid to actuator 19 to move piston 20 to the right, as viewed, with a velocity proportional to the magnitude of the electrical signal applied to the electromagnetic motor of the preamplifier. The displacement of the spool is directly proportional to the sense and magnitude of the control signal.

It should be noted that this arrangement comprises a balanced hydraulic bridge circuit having two pairs of variable orifices, one pair 70' and 71' being variable in response to the input signal to create unbalance of the bridge and thus initiate actuation of the spool, the other pair 52 and 53 being variable in response to displacement of the spool to effect rebalance of the bridge. This is a modified closed loop servo system with the loop extending to and including nozzles 70 and 71 and the spool 35, in contrast to an open loop system wherein the controller valve responds only to the command signal and wherein the fidelity of valve action is dependent wholly on calibration of the valve including mechanical resilient means such as centering or biasing springs associated with the valve spool. An important feature of the present invention therefore is the ability of the valve to function as a true error sensitive mechanism without need for biasing springs and the like. Since valve spool 35 is actuated entirely by fluid pressures, the forces causing displacement of the spool with respect to valve sleeve 24 are truly axial and friction losses resulting from lateral forces on the spool are considerably reduced.

Another important feature of this valve is the extremely small volume of fluid necessary to displace spool 35 through its range of movement. This is achieved by greatly reducing the piston area at each end of the spool through the use of a tubular spool in conjunction with end plugs 43 and 44 over which the spool slides. Since the volume change in the spool end chambers is directly proportional to the area of the end surfaces of the spool, it follows that the tubular spool described above effects a much smaller volume change per unit of displacement than does a solid spool. This volumetric reduction greatly increases the response characteristics of the valve, improves valve operation over a wider frequency band, and increases the frequency response of the system. The elimination of biasing springs also enables reduction of the volume of end chambers 36 and 37 and thus minimizes hydraulic compliance in the valve.

The valve shown in Figure 1 provides a flow of fluid to the actuator which is proportional to the input current to electromagnetic motor, and which is independent of the load on the actuator. In other words, the closed loop system includes the preamplifier and the spool but does not include the actuator. As the operating frequency of the servomechanism is increased, its response peaks or becomes rapidly more vigorous as the natural or resonant frequency of the system is approached. This effect is undesirable. In order to improve response and to level off such resonant peaking, I have provided means for making the servo valve responsive to the differential load on the actuator through utilization of pressure feedback in the system. The modified form of valve which includes pressure feedback is illustrated in Figure 2.

Figure 2:
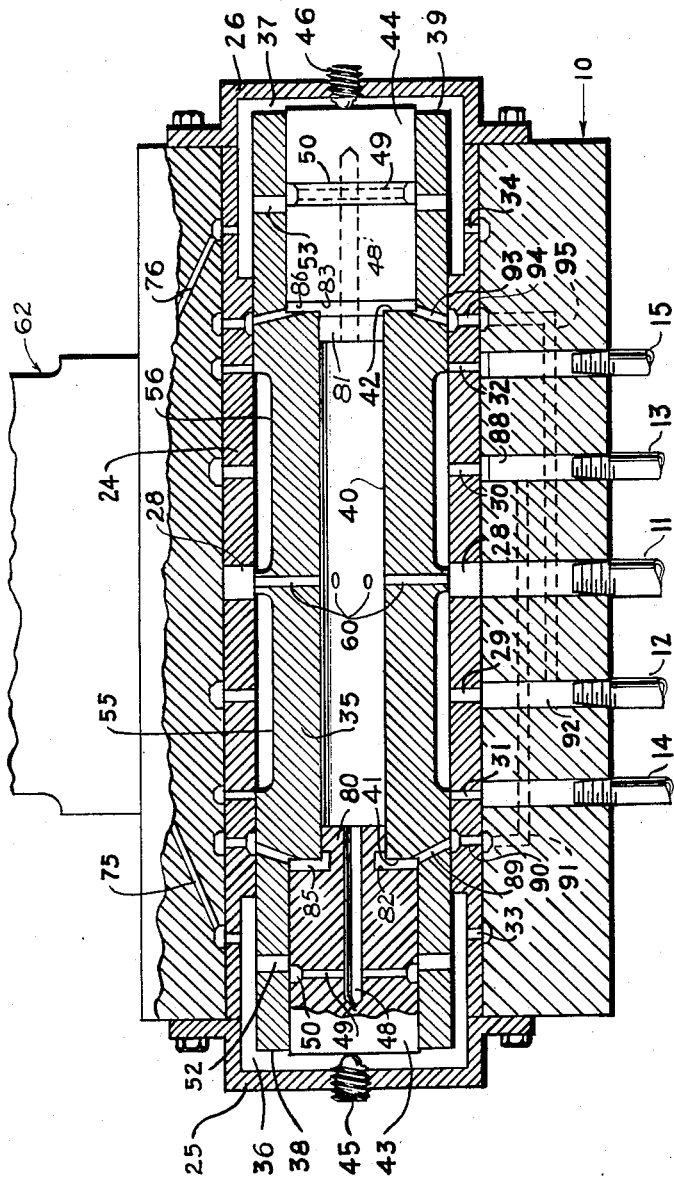
Figure 2 is a section similar to Figure 1 showing a modified form of servo valve.

The structure of the valve shown in Figure 2 is similar in many respects to the valve construction described above in conjunction with Figure 1, and accordingly, the following description will be devoted primarily to the modifications of the valve assembly and its operation, like reference characters indicating like parts in the valve assemblies of Figures 1 and 2.

Referring now to Figure 2, the inner ends of plugs 43 and 44 are formed with reduced cylindrical projections 80 and 81, respectively, which extend beyond shoulders 41 and 42 of the spool and engage the interior surface of the reduced spool bore in a sliding sealed fit. The inner faces 82 and 83 of the plug body portions are axially spaced from spool shoulders 41 and 42, respectively and define annular cavities 85 and 86 between the respective plug faces and spool shoulders. Cavity 85 is hydraulically connected to control pressure outlet channel 88 in housing 10 on the opposite side of the centrally located supply pressure port 28, the connection being traced from cavity 85 through spool passage 89, sleeve passage 90 and lateral passage 91 in the lower section of the housing to control passage 88. Similarly, the other cavity 86 communicates with control pressure outlet channel 92 through passages 93, 94 and 95. The axial length of each cavity is sufficient to permit communication of fluid from associated control pressure port at all times during valve operation, that is, movement of the spool relative to the plugs does not restrict communication of fluid to the cavities 85 and 86. In other respects, the valve assembly of Figure 2 is the same as that shown in Figure 1, it being understood that preamplifier unit 62 communicates through passages 75 and 76 with spool end chambers 36 and 37, respectively, for displacing spool 35 within valve sleeve 24, and that conduits 14 and 15 connect to drain, conduit 11 to a pump, and conduits 12 and 13 to opposite sides of an actuator in the same manner as shown in Figure 1.

A portion of the respective fluid pressures in the valve output lines 12 and 13 corresponding to the differential pressures applied to the actuator are fed back to cavities 85 and 86 and develop opposed reaction forces on the annular surfaces of spool shoulders 41 and 42. These reaction forces are proportional to the differential load on the actuator and by reason of the connection of each of cavities 85 and 86 to the control pressure port on the opposite side of the central supply pressure port 28, the resultant differential feedback force on the spool is in opposition to the differential actuating force developed against the end surfaces 38 and 39 of the spool. It will be noted that the surface area of each of shoulders 41 and 42 of the spool is less than the corresponding area of either of the spool end surfaces 38 and 39. The size relationship of these areas of the spool is predetermined and selected so that the effect of pressure feedback is substantially negligible for normal loads on the actuator, under which condition the spool movement is mainly in response to differential pressures in end chambers 36 and 37. As the load on the actuator increases, however, the differential feedback pressure communicated to cavities 85 and 86 increases proportionally and exerts a significant relative force on the spool shoulders so as to oppose the movement of the spool.

The operation of the valve assembly of Figure 2 is as follows: When the system is balanced, the pressures in spool end chambers 36 and 37 are equal as a result of the equal pressures in the preamplifier nozzles and the equal openings of rebalance spool ports or orifices 52 and 53, the spool is in the neutral position shown, the differential pressure across the actuator is zero, and the feedback pressures in cavities 85 nad 86 are equal. A signal or input current of one sense applied to the preamplifier causes an increase in pressure in one of passages 75 and 76, for example passage 75, and a decrease in the other. The resultant pressure increase in end chamber 36 and pressure decrease in chamber 37 effects displacement of the spool to the right, as viewed, and a differential pressure proportional to the input current appears across control conduits 12 and 13 and thus across the actuator. The load on the actuator determines the degree of build-up of back pressure on the high pressure side of the actuator, that is, in control conduit 12 for the operation being described, and this back pressure is communicated to cavity 86 on the right side of the spool, as viewed, through passages 95, 94 and 93, and develops a force against spool shoulder 42 in opposition to the force against the left spool end 38. The differential motive force on the spool is reduced by this feedback in proportion to the differential load on the actuator. As the actuator load increases, for example, if the actuator were locked or otherwise prevented from operating, the feedback pressure increases proportionally and acts against spool shoulder 42 in opposition to the actuating pressure in chamber 36 applied to spool end 38 and correspondingly decreases the rate of displacement of the spool.

The advantages of negative pressure feedback in improving the frequency characteristic of the servo system through damping are thus realized with my spool construction. Feedback ports 90 and 94 in sleeve 24 communicate with cavities 85 and 86 over the entire range of displacement of the spool which therefore is continuously responsive and sensitive to the load on the actuator. As the frequency of reciprocation of the actuator is increased and approaches the resonant frequency of the system, the integrated negative feedback feature of my valve introduces a damping effect which prevents undesirable resonant peaking.

Having described my invention, what is claimed is:

1. An electro-hydraulic servo valve comprising a valve housing having a bore, a stationary valve sleeve in said bore, said sleeve having supply and control and drain ports therein, a sliding spool movable axially in said sleeve for controlling fluid flow between said ports, a pressure chamber at each end of the spool, means for differentially changing hydraulic pressure in said chambers for displacing said spool within said sleeve, said spool having an open-ended axial bore, a pair of stationary plugs mounted in sliding fluid-tight relation in opposite ends of said movable spool bore, each plug having annular port means in its periphery communicating with the bore of the spool, said supply port also having communication with the spool bore whereby fluid at supply pressure exists at said annular port means of each plug, a rebalance port in each end of the spool communicating with the adjacent pressure chamber, each rebalance port and the adjacent plug port means overlying each other so as to restrict fluid flow therethrough, the degree of such restriction being dependent on and responsive to displacement of said spool relative to said plug.

2. An electro-hydraulic servo valve comprising valve housing means having a bore closed at opposite ends, a valve sleeve in said bore, said sleeve having a supply port and a pair of outlet ports and a pair of drain ports therein, a spool axially movable in said sleeve for controlling fluid flow between said ports, the ends of said spool being spaced from the closed ends of said housing means and defining therewith pressure chambers at opposite ends of said spool, means for differentially varying hydraulic pressures in said chambers for moving said spool within said sleeve, said spool having a bore communicating with said supply pressure port and having annular end surfaces against which the pressures in said chambers react, a pair of plugs in opposite ends of said spool bore and peripherally engaging the interior of said spool, a passage in each plug opening at one end into said spool bore and intersecting the plug periphery at the other, a port at each end of said spool, each of said spool end ports communicating with the adjacent pressure chamber and overlying the peripheral end of the adjacent plug passage thereby to throttle fluid passing from said plug into said chamber, said throttling action being responsive to movement of said spool upon unbalance of chamber pressures for rebalancing same and stopping further movement of said spool, and pressure feedback means for transmitting pressures from said outlet ports to said spool in opposition to pressures in said chambers.

3. The servo valve according to claim 2 with an internal annular shoulder on said spool adjacent to the plug in each end of the spool bore, said plug having an annular face axially spaced from each spool shoulder and defining therewith a cavity, said pressure feedback means comprising means defining independent fluid passageways connecting said outlet ports with said cavities, respectively, whereby the differential pressure across said outlet ports reacts against said spool shoulders in opposition to the differential pressure in said chambers acting on the ends of said spool.

4. The servo valve according to claim 3 in which the area of each of said shoulders is less than the area of each of the annular end surfaces on said spool.

5. An hydraulic servo valve comprising housing means defining a substantially cylindrical cavity, closed at both ends, having fluid supply, drain, and output ports spaced along its length, an open-ended, hollow spool mounted in axially sliding relation within said cavity for controlling the relative rates of fluid flow through respective ones of said ports, two cylindrical plugs fitted in essentially fluid-tight, sliding relation within respective ends of said open-ended hollow spool, said spool having a radial fluid passage connecting its hollow interior to said fluid supply port, whereby fluid fills said spool and presses said plugs outward toward the ends of said cavity, said housing means, said spool, and said plugs defining two variable-volume chambers within said cavity at respective ends at said spool, each of said plugs being provided with a circumferential groove and a fluid passage connecting said groove to the hollow interior of said spool, said spool having radial fluid passages opening into respective ones of said chambers and partially overlying respective ones of said grooves to form variable-area orifices, whereby the relative rates of fluid flow from said supply port into respective ones of said chambers is controlled by axial displacement of said spool within said cavity, and means for controlling the relative rates of fluid flow out of respective ones of said chambers to position said spool within said cavity.

6. An hydraulic servo valve as in claim 5, additionally comprising two screws extending through said housing means into opposite ends of said cavity and abutting on respective ones of said plugs for adjusting the null position of said spool.

7. An hydraulic servo valve as in claim 5, wherein said hollow spool has two outwardly facing, annular, internal shoulders adjacent to respective ones of said plugs, each plug has an inwardly facing, annular shoulder in opposed relation to the adjacent shoulder of said spool, said shoulders defining two variable-volume cavities between said spool and respective ones of said plugs, and means defining fluid passages connecting said variable-volume chambers with respective outlet ports.

References Cited in the file of this patent
UNITED STATES PATENTS

| 2,396,951 | Horstmann | Mar. 19, 1946 |
| 2,709,421 | Avery | May 31, 1955 |
| 2,733,689 | Badenoch | Feb. 7, 1956 |
| 2,767,689 | Moog | Oct. 23, 1956 |
| 2,797,666 | Chubbuck | July 2, 1957 |

FOREIGN PATENTS

| 802,298 | Germany | Feb. 8, 1951 |

UNITED STATES PATENT OFFICE
CERTIFICATE OF CORRECTION

Patent No. 2,904,055                                                    September 15, 1959

Robert R. Witherell

It is hereby certified that error appears in the printed specification of the above numbered patent requiring correction and that the said Letters Patent should read as corrected below.

Column 1, line 47, after "spool" insert -- increase --; column 2, line 63, for "differentially" read -- differently --; column 3, line 18, for "pressure" read -- pressures --; column 6, line 44, for "nad" read -- and --.

Signed and sealed this 15th day of March 1960.

(SEAL)

Attest:

KARL H. AXLINE                                                  ROBERT C. WATSON

Attesting Officer                                              Commissioner of Patents